United States Patent
Kistler et al.

(10) Patent No.: US 11,057,980 B2
(45) Date of Patent: Jul. 6, 2021

(54) EXTENDED SIGNALING CAPACITY IN A DALI SYSTEM

(71) Applicant: TRIDONIC GMBH & CO KG, Dornbirn (AT)

(72) Inventors: Roger Kistler, Ennenda (CH); Markus Künzli, Clarus (CH)

(73) Assignee: TRIDONIC GMBH & CO KG, Dornbirn (AT)

( * ) Notice: Subject to any disclaimer, the term of this patent is extended or adjusted under 35 U.S.C. 154(b) by 0 days.

(21) Appl. No.: 16/753,108

(22) PCT Filed: Oct. 22, 2018

(86) PCT No.: PCT/EP2018/078926
§ 371 (c)(1),
(2) Date: Apr. 2, 2020

(87) PCT Pub. No.: WO2019/086289
PCT Pub. Date: May 9, 2019

(65) Prior Publication Data
US 2020/0323071 A1 Oct. 8, 2020

(30) Foreign Application Priority Data
Nov. 6, 2017 (DE) .................. 10 2017 219 659.9

(51) Int. Cl.
*H05B 47/18* (2020.01)
*H04L 12/40* (2006.01)
(52) U.S. Cl.
CPC ............. *H05B 47/18* (2020.01); *H04L 12/40* (2013.01)

(58) Field of Classification Search
CPC ........ H05B 47/18; H05B 47/16; H05B 47/11; H05B 47/105; H05B 47/185; H05B 45/10; H05B 45/20; H04L 12/40; Y02B 20/40
See application file for complete search history.

(56) References Cited

U.S. PATENT DOCUMENTS 5,347,515 A 9/1994 Marino
6,762,570 B1 * 7/2004 Fosler ................... H05B 47/18
315/312

(Continued)

FOREIGN PATENT DOCUMENTS

DE 10 2010 020746 11/2011
DE 20 2012 008421 12/2012

(Continued)

OTHER PUBLICATIONS

German search report dated Jun. 27, 2018 in priority application DE 10 2017 219 6599.

(Continued)

*Primary Examiner* — Haissa Philogene
(74) *Attorney, Agent, or Firm* — Andrus Intellectual Property Law

(57) ABSTRACT

The invention relates to a signaling device (2) for use in a DALI system (1) with a DALI bus (B), wherein, according to the DALI standard, an upper voltage value range (DH) is established for the bus voltage of the DALI bus (B) for transmitting a high-level DALI signal via the DALI bus, and the bus voltage of the DALI bus (B) lies within the upper voltage value range (DH) in the idle state, wherein the signaling device (2) is configured for being connected to the DALI bus (B) of the DALI system (1), and wherein, in the connected state, the signaling device (2) is configured to change the bus voltage of the DALI bus to a predetermined voltage value (U2) within the upper voltage value range (Continued)

(DH) in the idle state. The invention also relates to a DALI device (3a, 3b, 3c) for use in a DALI system (1) with a DALI bus (B), which is configured for registering the above-mentioned signaling using the signaling device (2) according to the invention.

19 Claims, 4 Drawing Sheets

(56) References Cited

U.S. PATENT DOCUMENTS

| | | | |
|---|---|---|---|
| 9,320,119 B2* | 4/2016 | Lochmann | H05B 47/185 |
| 9,379,608 B2* | 6/2016 | Hoffknecht | H04L 12/40045 |
| 9,497,835 B2* | 11/2016 | Koch | H05B 47/16 |
| 10,104,745 B2* | 10/2018 | Csibi | H05B 47/18 |

FOREIGN PATENT DOCUMENTS

| | | |
|---|---|---|
| DE | 20 2015 104940 | 12/2016 |
| DE | 10 2016 201390 | 8/2017 |
| EP | 1 338 181 | 4/2006 |
| WO | 2009114889 | 9/2009 |

OTHER PUBLICATIONS

PCT search report dated Jan. 30, 2019 in parent application PCT/EP2018/078926.

* cited by examiner

EXTENDED SIGNALING CAPACITY IN A DALI SYSTEM

CROSS REFERENCE TO RELATED APPLICATIONS

The present application is the U.S. national stage application of international application PCT/EP2018/078926 filed Oct. 22, 2018, which international application was published on May 9, 2019 as International Publication WO 2019/086289 A1. The international application claims priority to German Patent Application 10 2017 219 659.9 filed Nov. 6, 2017.

FIELD OF THE INVENTION

The present invention relates to a signaling device for use in a DALI system with a DALI bus; a DALI device for use in a DALI system with a DALI bus; a DALI system with a DALI bus, at least one such signaling device according to the invention and at least one such DALI device; a use of such a signaling device according to the invention in a DALI system with a DALI bus and a use of such a signaling device according to the invention and such a DALI device according to the invention.

BACKGROUND OF THE INVENTION

DALI systems with a DALI bus are known from the prior art, in which devices are connected to one another via the DALI bus, in order to communicate with one another via the DALI bus according to the DALI industrial standard. The abbreviation DALI here stands for "Digital Addressable Lighting Interface." A device which can be connected to a DALI bus and can communicate according to the DALI industrial standard via the DALI bus is also called a DALI device. DALI devices are in particular lighting technology devices such as, for example, an illuminant operating device for operating at least one illuminant or a light sensor for detecting the ambient light.

Typically, in a DALI system, the DALI device connected to the DALI bus is activated by a central DALI device in that DALI signals are transmitted as control signals from the central DALI device via the DALI bus to all DALI devices connected to the DALI bus. To this end, individual DALI devices connected to the DALI bus can be activated via their respective operating address.

In practice, it has now been found that, in addition to the normal central DALI activation described above, it is desirable to enable a manual activation of the DALI devices by a signaling device, such as, for example, a switch or a sensor.

A number of approaches to this are already known from the prior art. In a first approach, a DALI device to be manually activated is provided with an additional interface in addition to the DALI interface for the purpose of connection to a DALI bus, via which additional interface the DALI device can be connected to a signaling device for manual activation. This first approach has the disadvantage that two separate interfaces—one for the DALI bus and one for the signaling device—are always required on the DALI device. This increases the number of components required and thus also the space required. This also requires separately routed lines in the installation in order to be able to connect both components.

In a second approach, the DALI device to be manually activated is provided with an interface which is suitable both for connecting to a DALI bus and for connecting to a signaling device for manual activation. That means that either the interface is connected to a DALI bus in order to be controlled by DALI signals, or the interface is connected to a signaling device in order to be manually activated therefrom. This second approach thus has the disadvantage that an activation via a DALI bus and a manual activation via a signaling device cannot take place simultaneously.

In a third approach, an additional module with an integrated microcontroller is provided, by means of which the signals generated by the signaling device for manual activation can be converted into DALI signals. This third approach has the disadvantage that the additional module with the integrated microcontroller greatly increases the financial outlay.

In patent EP 1 338 181 B1, in the case of a DALI device connected to a DALI bus, the DALI commands are temporarily manually overridden by replacing the DALI commands by manually generated commands. This local manual control (by overriding the existing DALI activation) of a DALI device is made possible in that the signal lengths below a predetermined threshold value are interpreted as DALI signals or DALI control commands, while signal lengths above the threshold value are interpreted as manual overriding and overwriting and consequently as manual control signals. In this manual operating mode, the information content of the signal will then also fall within the length of the signal itself. The approach of patent EP 1 338 181 B1 is thus disadvantageous in that a parallel operation or a simultaneous operation of the DALI operating mode, in which DALI signals are used to activate the DALI device, and the manual operating mode, in which the information content of the signal lies in the length of the signal itself, is not possible.

In the light of the above prior art, it is therefore an object of the present invention to provide a signaling device and a DALI device with which a manual activation of the DALI device in addition to the activation with DALI signals is possible without the above disadvantages. In particular, it is to be achieved that a DALI device can be activated by DALI signals via a DALI bus and can be activated simultaneously or in parallel manually.

These and other objects, which will also be mentioned in the reading of the following description or which can be recognized by a person skilled in the art, are solved by the subject-matter of the independent claims. The dependent claims develop the central idea of the present invention in a particularly advantageous manner.

SUMMARY OF THE INVENTION

According to the present invention, a signaling device is provided for use in a DALI system with a DALI bus; wherein, according to the DALI standard, an upper voltage value range is established for the bus voltage of the DALI bus for transmitting a high-level DALI signal via the DALI bus, and the bus voltage of the DALI bus lies within the upper voltage value range in the idle state; wherein the signaling device is configured to be connected to the DALI bus of the DALI system, and wherein, in the connected state, the signaling device is configured to change the bus voltage of the DALI bus to a predetermined voltage value within the upper voltage value range in the idle state.

In other words, the present invention proposes providing, for the manual activation of a DALI device, a signaling device which can be connected to a DALI bus and which can change the bus voltage in the idle state to a predetermined voltage value which is within the upper voltage value range for transmitting a high-level DALI signal in accordance with the DALI standard.

The signaling device according to the invention is thus advantageous since, on the one hand, by changing the bus voltage in the idle state to the predetermined voltage value, at least one signal can be transmitted via the DALI bus for the manual activation of a DALI device and, on the other hand, DALI signals can also be transmitted simultaneously via the DALI bus during this change in the voltage value of the bus voltage in the idle state. Specifically, the change is made to a predetermined voltage value within the upper voltage value range for transmitting a high-level DALI according to the DALI standard. This means that, even after the change to the predetermined voltage value, the voltage value of the bus voltage corresponds to a voltage value within the upper voltage value range for transmitting a high-level DALI according to the DALI standard. Consequently, even after the change in the bus voltage in the idle state to the predetermined voltage value, DALI signals can continue to be transmitted via the DALI bus and be received by the DALI device.

In the present application, the terms "DALI Standard" and "DALI industrial standard" are used synonymously.

Preferably, DALI signals are transmitted according to the DALI standard by short-circuiting the DALI bus, wherein the bus voltage of the DALI bus preferably decreases to zero volts (0 V) during a short circuit of the DALI bus. Consequently, by short-circuiting the DALI bus, a falling edge of the bus voltage from the bus voltage in the idle state to zero volts is preferably generated, which preferably corresponds to a logical one ("1"); and upon cancellation of the short circuit of the DALI bus, a rising edge of the bus voltage from zero volts to the voltage value of the bus voltage in the idle state is again generated, which preferably corresponds to a logical zero ("0"). Alternatively, a falling edge can correspond to a logical zero ("0") and a rising edge can correspond to a logical one ("1"). In this way, DALI signals, which are digital signals, in particular binary-encoded signals, are preferably generated on the DALI bus. In particular, DALI signals are Manchester-encoded.

Preferably, each bit of a DALI signal is "bi-phase" encoded if the DALI signal is Manchester-encoded. That is, each bit of the DALI signal preferably consists of a high phase for one half of the bit transmission time and a low phase of the bus voltage for the other half of the bit transmission time, or, during the transmission of a bit, the bus voltage preferably corresponds to the voltage value of the bus voltage in the idle state (high phase) for one half of the bit transmission time and zero volts due to a short circuit of the DALI bus (low phase) for the other half of the bit transmission time. The intermediate edge lying between the high level and low level for half the bit transmission time period then serves to evaluate the bit, that is to say, the intermediate edge indicates whether the bit corresponds to a logical one ("1") or a logical zero ("0"). A rising edge, that is, a transition for half the bit transmission time period from the low phase to the high phase, preferably represents a logical one ("1"); and a falling edge, that is, a transition for half the bit transmission time period from the high phase to the low phase, preferably represents a logical zero ("0"). The term "DALI signal" and "DALI control signal" are used as synonyms in the present application.

The "connected state" of the signaling device is understood to be the state in which the signaling device is connected to the DALI bus or is electrically connected thereto.

The bus voltage of the DALI bus in the idle state preferably corresponds to the voltage with which the DALI bus is electrically supplied. That is, the bus voltage in the idle state preferably corresponds to the bus voltage of the DALI bus in the non-short-circuited state of the DALI bus.

The upper voltage value range for transmitting a high-level DALI signal according to the DALI standard preferably corresponds to a voltage value range between 9.5 volts and 22.5 volts.

The DALI bus is preferably electrically supplied with voltage, current and/or electrical energy from an electrical power supply source or a DALI device connected to the DALI bus.

In the connected state, the signaling device is preferably configured to transmit at least one preferably digital signal, in particular a binary-encoded signal, via the DALI bus by changing the bus voltage to the predetermined voltage value.

That is, by changing the bus voltage from the voltage value of the bus voltage in the idle state to the predetermined voltage value, at least one digital signal is preferably transmitted.

Alternatively or additionally, the signaling device in the connected state is preferably configured to transmit at least one analog signal via the DALI bus by changing the bus voltage to the predetermined voltage value.

That is, by changing the bus voltage from the voltage value of the bus voltage in the idle state to the predetermined voltage value, at least one analog signal is preferably transmitted.

The time period of the change of the bus voltage to the predetermined voltage value is preferably dependent on the temporal actuation of the signaling device by a user.

The signaling device is preferably configured for transmitting at least one digital signal in such a way that the bus voltage in the idle state corresponds to a logical zero ("0") and the predetermined voltage value corresponds to a logical one ("1"). That is, if the bus voltage in the idle state is not changed by the signaling device, this will preferably correspond to a logical zero ("0") and, if the bus voltage is changed by the signaling device to the predetermined voltage value, this will preferably correspond to a logical one ("1"). The assignment of the logical zero and logical one to the voltage value of the bus voltage in the idle state and the predetermined voltage value can also be reversed.

In order to recognize a transmission of a signal from the signaling device via the DALI bus, the bus voltage of the DALI bus is preferably measured periodically and its differences evaluated as a function of the time period. For the recognition of a transmission of a signal from the signaling device, voltage values which lie outside the upper voltage value range for transmitting a DALI signal can be ignored.

Preferably, when the bus voltage is changed by the signaling device, the edge from the voltage value of the bus voltage in the idle state to the predetermined voltage value can correspond to a logical one ("1"), and the edge from the predetermined voltage value to the voltage value of the bus voltage in the idle state can correspond to a logical zero ("0"). The assignment of the logical zero and logical one to the edges can also be reversed.

In particular, in the connected state, the signaling device is configured to transmit at least one digital signal, in particular a binary-encoded signal, or at least one analog signal via the DALI bus by limiting or reducing the bus voltage in the idle state to the predetermined voltage value.

The predetermined voltage value is preferably less than the voltage value of the bus voltage in the idle state, and, in the connected state, the signaling device is preferably configured to limit the bus voltage of the DALI bus in the idle state to the predetermined voltage value. Alternatively, the predetermined voltage value is preferably greater than the voltage value of the bus voltage in the idle state, and the signaling device, in the connected state, is preferably configured to increase the bus voltage of the DALI bus in the idle state to the predetermined voltage value.

The predetermined voltage value preferably differs by 0.5 V or more than 0.5 V, particularly preferably by 1 V or more than 1 V, very particularly preferably by 3 V or more than 3 V, from the bus voltage of the DALI bus in the idle state. In particular, the predetermined voltage value is preferably less than the bus voltage in the idle state by 0.5 V or more than 0.5 V, particularly preferably by 1 V or more than 1 V, very particularly preferably by 3 V or more than 3 V.

The signaling device preferably further comprises at least one voltage limitation unit, particularly preferably a Zener diode, which is configured to limit the bus voltage of the DALI bus in the idle state to the predetermined voltage value. Alternatively, the signaling device preferably comprises at least one voltage booster unit, particularly preferably a voltage source, which is configured to increase the bus voltage of the DALI bus in the idle state to the predetermined voltage value.

Furthermore, the signaling device preferably corresponds to a switch arrangement having at least one switch, which, in the connected state, is configured to increase or limit the bus voltage of the DALI bus on the basis of an actuation of the switch by a user to the predetermined voltage value for the time period of the actuation or for a predetermined time period. Alternatively, the signaling device preferably corresponds to a relay arrangement having a relay which, in the connected state, is configured to increase or limit the bus voltage of the DALI bus on the basis of an actuation of the relay by a user to the predetermined voltage value for the time period of the actuation or for a predetermined time period. Alternatively, the signaling device preferably corresponds to a sensor arrangement having at least one sensor which, in the connected state, is configured to increase or limit the bus voltage of the DALI bus on the basis of a detection by the sensor to the predetermined voltage value for the time period of the detection or for a predetermined time period.

The signaling device is preferably a combination of the arrangements described above. That is, the signaling device can be, for example, a combination of a switch arrangement and a sensor arrangement, wherein the signaling device is preferably configured to change, in particular to limit, the bus voltage of the DALI bus on the basis of an actuation of the switch and/or a detection of the sensor to the predetermined voltage value for the time period of the actuation of the switch, for the time period of the detection or for a predetermined time period.

For example, the signaling device can correspond to a presence and/or motion sensor arrangement having at least one presence and/or motion sensor and additionally having a switch. The signaling device can then be configured to change, in particular to limit, the bus voltage of the DALI bus to which it is connected to the predetermined voltage value when the presence and/or motion sensor detects a presence and/or motion of a person and/or when a user actuates the switch.

Preferably, the signaling device corresponds to a switch arrangement having a first switch and a second switch, which arrangement, in the connected state, is configured to increase or limit the bus voltage of the DALI bus on the basis of an actuation of the first switch by a user to a first predetermined voltage value for the time period of the actuation or for a predetermined time period; and to increase or limit the bus voltage of the DALI bus on the basis of an actuation of the second switch by a user to a second predetermined voltage value for the time period of the actuation or for a predetermined time period.

According to the present invention, a DALI device for use in a DALI system with a DALI bus is further provided, wherein, according to the DALI standard, an upper voltage value range is established for the bus voltage of the DALI bus for transmitting a high-level DALI signal via the DALI bus, and the bus voltage of the DALI bus lies within the upper voltage value range in the idle state; wherein the DALI device is configured to be connected to the DALI bus in a DALI system as a bus device; and wherein the DALI device is configured, in the connected state, to detect a change in the bus voltage of the DALI bus in the idle state to a predetermined voltage value within the upper voltage value range In other words, the present invention proposes providing a DALI device for the manual activation of a DALI device which, in addition to DALI signals in accordance with the DALI standard, can also recognize at least one signal of a manual activation by being configured to detect a change in the bus voltage of the DALI bus to which it is connected to a predetermined voltage value within the upper voltage value range of the DALI standard.

The DALI device according to the invention is thus advantageous since, on the one hand, by changing the bus voltage in the idle state to the predetermined voltage value, at least one signal for the manual activation of the DALI device via the DALI bus can be received by the DALI device and, on the other hand, DALI signals can also be received simultaneously via the DALI bus during this change in the voltage value of the bus voltage in the idle state to the predetermined voltage value. Specifically, the change is made to a predetermined voltage value, which is within the upper voltage value range for transmitting a high-level DALI according to the DALI standard. This means that, even after the change to the predetermined voltage value, the voltage value of the bus voltage will correspond to a voltage value within the upper voltage value range for transmitting a high-level DALI according to the DALI standard. Consequently, after the change of the bus voltage in the idle state to the predetermined voltage value, DALI signals can continue to be transmitted via the DALI bus and received by the DALI device.

The "connected state" of the DALI device is understood to be the state in which the DALI device is connected to the DALI bus or is electrically connected thereto.

A "DALI device" is preferably understood to mean a device which can be connected to a DALI bus and is configured to transmit and/or receive information or data according to the DALI standard via the DALI bus. That is, a DALI device is preferably configured to transmit and/or receive DALI signals via a DALI bus. A DALI device is in particular a lighting technology device. A DALI device preferably comprises or corresponds to an operating device for the electrical supply of at least one illuminant, in particular an operating device for the electrical supply of at least one light-emitting diode (LED). A DALI device can additionally or alternatively comprise or correspond to at least one sensor, such as, for example, a brightness sensor, a temperature sensor and/or a presence and/or motion sensor.

In particular, the DALI device is configured to detect a limitation or reduction of the bus voltage in the idle state to the predetermined voltage value within the upper voltage value range.

In the connected state, the DALI device is preferably configured to receive at least one preferably digital signal, in particular a binary-encoded signal, via the DALI bus by detecting a change in the bus voltage of the DALI bus in the idle state to the predetermined voltage value within the upper voltage value range.

That is, the DALI device is preferably configured to receive at least one digital signal when it detects a change in the bus voltage of the DALI bus in the idle state to the predetermined voltage value within the upper voltage value range.

Alternatively or additionally, in the connected state, the DALI device is preferably configured to receive at least one analog signal via the DALI bus by detecting a change in the bus voltage of the DALI bus in the idle state to the predetermined voltage value within the upper voltage value range.

That is, the DALI device is preferably configured to receive at least one analog signal when it detects a change in the bus voltage of the DALI bus in the idle state to the predetermined voltage value within the upper voltage value range.

In particular, the DALI device is configured to detect and evaluate a change in the bus voltage of the DALI bus (B) in the idle state to the predetermined voltage value (U1) within the upper voltage value range as a digital signal or an analog signal.

The DALI device is preferably configured for detecting at least one digital signal in such a way that the bus voltage in the idle state corresponds to a logical zero ("0") and the predetermined voltage value corresponds to a logical ("1"). That is, if the bus voltage in the idle state is not changed to a different voltage value within the upper voltage value range of the DALI standard, this will preferably correspond to a logical zero ("0") and, when the bus voltage is changed by the signaling device to the predetermined voltage value, this will preferably correspond to a logical one ("1"). The assignment of the logical zero and logical one to the voltage value of the bus voltage in the idle state and the predetermined voltage value can also be reversed.

In particular, the DALI device can be configured to evaluate each voltage value within the upper voltage value range of the DALI standard that differs from the voltage value of the bus voltage in the idle state as a logical one ("1"). In this case, the deviation preferably has to be at least equal to 0.5 V, particularly preferably at least equal to 1 V, very particularly preferably at least equal to 3 V.

In particular, the DALI device can evaluate the edge from the voltage value of the bus voltage in the idle state to the predetermined voltage value as a logical one ("1") and then correspondingly evaluate the edge from the predetermined voltage value to the voltage value of the bus voltage in the idle state as a logical zero ("0"). The assignment of the logical zero and logical one to the edges can also be reversed.

In particular, the DALI device is configured to receive at least one digital signal, in particular a binary-encoded signal, or at least one analog signal via the DALI bus by detecting a limitation or reduction of the bus voltage in the idle state to the predetermined voltage value within the upper voltage value range.

Furthermore, according to the DALI standard, a lower voltage value range is preferably established for the bus voltage of the DALI bus for transmitting a low-level DALI signal via the DALI bus, and, in the connected state, the DALI device is preferably configured to receive at least one DALI signal by detecting a reduction in the bus voltage of the DALI bus in the idle state to a voltage value within the lower voltage value range.

The voltage value within the lower voltage value range preferably corresponds to zero volts, wherein the reduction in the bus voltage in the idle state to zero volts is preferably caused by short-circuiting the DALI bus. The DALI device is preferably configured to receive at least one DALI signal by detecting a reduction in the bus voltage in the idle state to zero volts. In particular, the DALI device is configured to detect a short circuit of the DALI bus and thereby to receive a DALI signal.

Furthermore, in the connected state, the DALI device is preferably configured to receive at least one preferably digital signal and at least one DALI signal simultaneously by detecting a change in the bus voltage of the DALI bus in the idle state to the predetermined voltage value within the upper voltage value range and a reduction in the bus voltage of the DALI bus from the predetermined voltage value to a voltage value within the lower voltage value range.

In other words, in the connected state, the DALI device is preferably configured to receive at least one digital or analog signal and at least one DALI signal simultaneously by detecting a change in the bus voltage of the DALI bus in the idle state to the predetermined voltage value within the upper voltage value range and a reduction in the bus voltage of the DALI bus from the predetermined voltage value to a voltage value within the lower voltage value range.

The DALI device is preferably configured to receive at least one digital or analog signal by detecting a change in the bus voltage of the DALI bus in the idle state to the predetermined voltage value within the upper voltage value range, wherein the DALI device is preferably configured to simultaneously receive at least one DALI signal when it detects a reduction in the bus voltage from the predetermined voltage value to a voltage value within the lower voltage value range of the DALI standard during the detection of the change in the bus voltage to the predetermined voltage value.

In particular, the DALI device is preferably configured to receive at least one digital or analog signal and at least one DALI signal simultaneously by detecting a limitation or reduction of the bus voltage of the DALI bus in the idle state to the predetermined voltage value within the upper voltage value range and a reduction of the bus voltage of the DALI bus from the predetermined voltage value to a voltage value within the lower voltage value range of the DALI standard.

In the connected state, the DALI device is preferably configured to transmit at least one DALI signal via the DALI bus by reducing the bus voltage of the DALI bus to a voltage value within the lower voltage value range.

The DALI device is preferably configured to transmit at least one DALI signal via the DALI bus by short-circuiting the DALI bus.

In particular, the DALI device is configured to transmit at least one DALI signal via the DALI bus by reducing the bus voltage to a voltage value within the lower voltage value range, in particular by short-circuiting the DALI bus, in response to detecting the change in the bus voltage to the predetermined voltage value.

That is, the DALI device is preferably configured to transmit at least one DALI signal via the DALI bus when it has received at least one digital or analog signal by detecting a change in the bus voltage to the predetermined voltage value.

Furthermore, according to the present invention, a DALI system is provided, wherein the DALI system comprises a DALI bus, at least one signaling device according to the invention described above, and at least one DALI device according to the invention described above; wherein the at least one signaling device and the at least one DALI device are connected to the DALI bus; wherein the signaling device is configured to change the bus voltage of the DALI bus in the idle state to a predetermined voltage value within the upper voltage value range; and wherein the DALI device is configured to detect the change in the bus voltage of the DALI bus in the idle state to the predetermined voltage value within the upper voltage value range.

The DALI system according to the invention is advantageous, since the signaling device and the DALI device are configured to communicate with each other via the DALI bus by changing the bus voltage in the idle state to a predetermined voltage value within the upper voltage value range of the DALI standard, wherein a simultaneous or parallel transmission of DALI signals via the DALI bus is possible. Consequently, according to the invention, no separate interface is required in the DALI device for the communication between the signaling device and the DALI device in addition to the DALI interface for connecting to the DALI bus, thereby minimizing the complexity in the hardware and the space required. Furthermore, the communication between the signaling device and the DALI device and the communication by DALI signals can take place simultaneously or in parallel via the DALI bus.

In particular, the signaling device is configured to limit or reduce the bus voltage of the DALI bus in the idle state to a predetermined voltage value within the upper voltage value range of the DALI standard; and the DALI device is in particular configured to detect the limitation or reduction of the bus voltage of the DALI bus in the idle state to the predetermined voltage value within the upper voltage value range of the DALI standard.

The DALI device is preferably configured to receive at least one preferably digital signal, in particular a binary-encoded signal, from the signaling device via the DALI bus by detecting the change in the bus voltage of the DALI bus in the idle state to the predetermined voltage value within the upper voltage value range.

In other words, the DALI device is preferably configured to receive at least one digital signal, in particular a binary-encoded signal, or at least one analog signal from the signaling device via the DALI bus by detecting the change in the bus voltage of the DALI bus in the idle state to the predetermined voltage value within the upper voltage value range.

In particular, in the DALI system according to the invention, the DALI device is configured to receive at least one digital signal, in particular a binary-encoded signal, or at least one analog signal from the signaling device via the DALI bus by detecting a limitation or reduction of the bus voltage of the DALI bus in the idle state to the predetermined voltage value within the upper voltage value range.

In particular, in the DALI system according to the invention, the DALI device is configured to recognize and evaluate a limitation or reduction of the bus voltage in the idle state to the predetermined voltage value as a digital or analog signal.

Furthermore, the DALI device is preferably configured to transmit at least one DALI signal via the DALI bus by reducing the bus voltage to a voltage value within the lower voltage value range, while the bus voltage of the DALI bus in the idle state corresponds to the predetermined voltage value within the upper voltage value range.

That is, the DALI device is preferably configured to transmit at least one DALI signal via the DALI bus by reducing the bus voltage to a voltage value within the lower voltage value range of the DALI standard, while the signaling device has changed the bus voltage of the DALI bus in the idle state to the predetermined voltage value within the upper voltage value range of the DALI standard.

In particular, the DALI device is configured to transmit at least one DALI signal via the DALI bus by reducing the bus voltage to a voltage value within the lower voltage value range of the DALI standard, while the signaling device limits the bus voltage of the DALI bus in the idle state to the predetermined voltage value within the upper voltage value range of the DALI standard.

Furthermore, in the connected state, the DALI device is preferably configured to receive at least one preferably digital signal from the signaling device and at least one DALI signal simultaneously by detecting a change in the bus voltage of the DALI bus in the idle state to the predetermined voltage value by the signaling device and a reduction of the bus voltage of the DALI bus from the predetermined voltage value to a voltage value within the lower voltage value range.

In other words, in the connected state, the DALI device is preferably configured to receive at least one digital or analog signal from the signaling device and at least one DALI signal simultaneously by detecting a change in the bus voltage of the DALI bus in the idle state to the predetermined voltage value by the signaling device and a reduction of the bus voltage of the DALI bus from the predetermined voltage value to a voltage value within the lower voltage value range.

The present invention further relates to a use of a signaling device according to the invention described above in a DALI system with a DALI bus for transmitting at least one preferably digital signal via the DALI bus, wherein the signaling device is connected to the DALI bus of the DALI system, and wherein, in the connected state, the signaling device changes the bus voltage of the DALI bus in the idle state to a predetermined voltage value within the upper voltage value range.

In other words, the present invention relates to a use of a signaling device according to the invention described above in a DALI system with a DALI bus for transmitting at least one digital or analog signal via the DALI bus, wherein the signaling device is connected to the DALI bus of the DALI system, and wherein, in the connected state, the signaling device changes the bus voltage of the DALI bus in the idle state to a predetermined voltage value within the upper voltage value range.

The present invention further relates to a use of a signaling device according to the invention described above and a DALI device according to the invention described above in a DALI system with a DALI bus for communication via the DALI bus, wherein the signaling device and the DALI device are connected to the DALI bus of the DALI system, wherein the signaling device, in the connected state, changes the bus voltage of the DALI bus in the idle state to a predetermined voltage value within the upper voltage value range, and wherein the DALI device detects the change in the bus voltage of the DALI bus in the idle state to the predetermined voltage value within the upper voltage value range.

BRIEF DESCRIPTION OF THE DRAWINGS

A detailed description of the figures is given below. These show.

DETAILED DESCRIPTION

In the figures, corresponding elements are marked with the same reference symbols.

Figure 1:
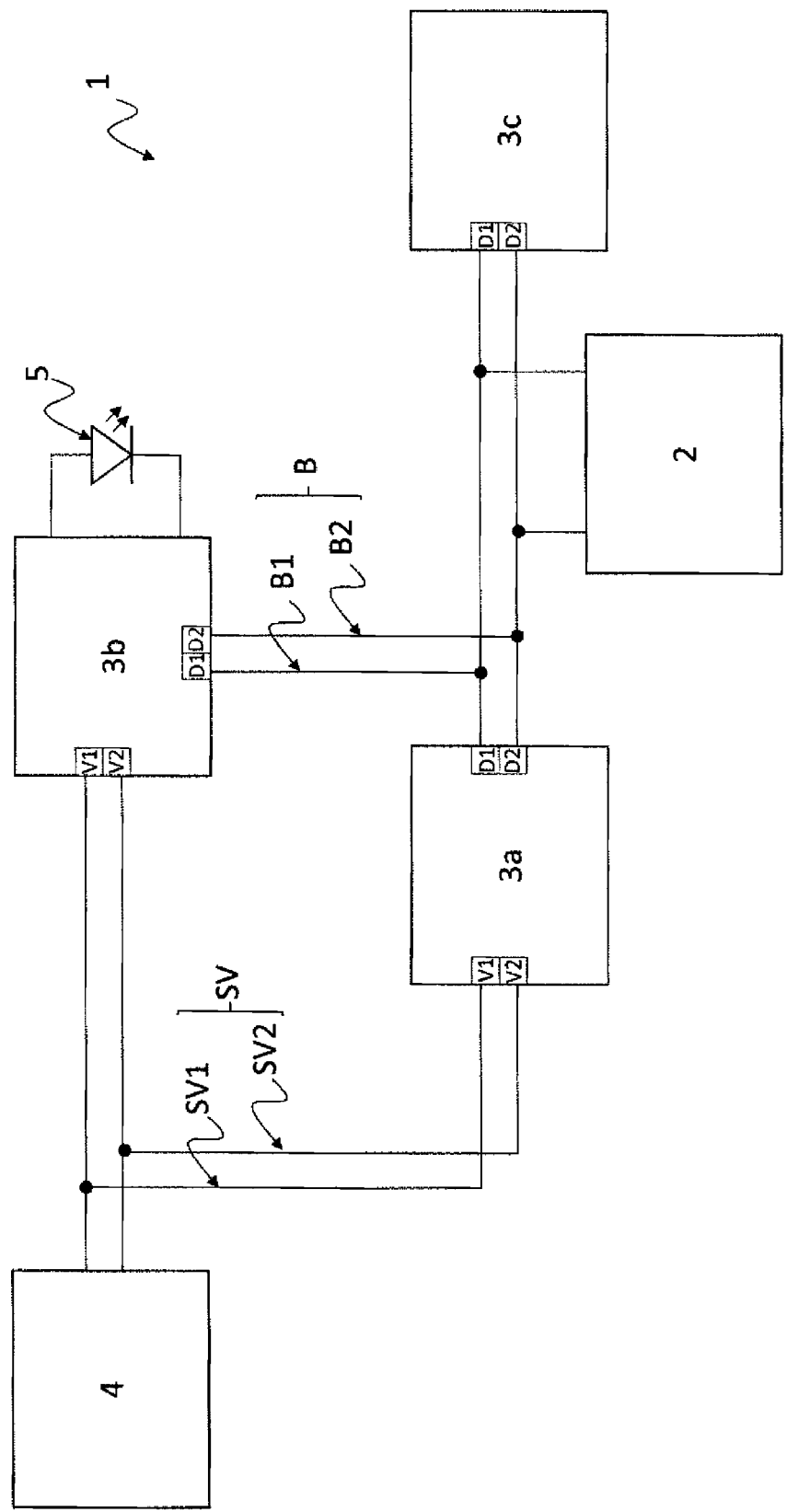
FIG. 1 is a schematic circuit diagram of a preferred embodiment of a DALI system according to the invention with a signaling device according to the invention and three DALI devices according to the invention.

FIG. 1 shows a schematic circuit diagram of a preferred embodiment of a DALI system according to the invention with a signaling device according to the invention and three DALI devices according to the invention.

The DALI system 1 in FIG. 1 comprises a DALI bus B, a signaling device 2 and three DALI devices 3a, 3b and 3c. The electric power supply source 4 and/or the supply network SV can be part of the DALI system 1 or arranged externally to the DALI system 1.

The DALI system according to the invention can preferably comprise one or more signaling devices and one or more DALI devices. For the following description of the present invention, it is assumed that the DALI system 1 comprises one signaling device 2 and three DALI devices 3a, 3b and 3c.

The electric power supply source 4 is configured to provide electrical energy, current and/or voltage for the DALI system 1, in particular the DALI devices 3a and 3b. The electric power supply source 4 preferably corresponds to an AC voltage source, in particular the power grid, which preferably provides an AC voltage of 230 volts. Alternatively, the electric power supply source 4 can also correspond to a DC voltage source, such as, for example, a preferably rechargeable battery. According to the invention, any electrical power supply source known to a person skilled in the art, which is configured for the electrical supply of DALI devices, can be used for the electric power supply source 4.

As shown in FIG. 1, only the DALI devices 3a and 3b are electrically supplied from the electric power supply source 4. The DALI device 3c is preferably electrically supplied either via an internal power supply source or via the bus voltage of the DALI bus B. However, the DALI device 3c can also be supplied from the electric power supply source 4.

For the electrical power supply of the DALI devices 3a and 3b, these are electrically connected to the electric power supply source 4 via a supply network SV, in particular two supply lines SV1 and SV2. In this case, the supply line SV1 can correspond to a current-carrying phase conductor ("P conductor") and the supply line SV2 can correspond to a neutral conductor ("N conductor") via which the current from the respective DALI device 3a, 3b returns to the electric power supply source 4. The two DALI devices 3a and 3b each comprise one supply input with two supply connections V1 and V2 to which the two supply lines SV1 and SV2 are connected.

As shown in FIG. 1, the DALI bus B comprises two bus lines B1 and B2. The three DALI devices 3a, 3b and 3c are each connected via their DALI interface D1, D2 to the DALI bus B. In this case, the bus line B1 of the DALI bus B is connected to the DALI connection D1 of the DALI interface and the bus line B2 of the DALI bus B is connected to the DALI connection D2 of the DALI interface of a DALI device.

The bus voltage of the DALI bus in the idle state preferably corresponds to a voltage value within the upper voltage value range for the transmission of a high-level DALI signal according to the DALI standard. In particular, the bus voltage in the idle state corresponds to a voltage value between 9.5 and 22.5 volts.

The DALI bus B is preferably electrically supplied with a voltage, current and/or electrical energy by an electrical power supply source that is separate from the electric power supply source 4 or by a DALI device connected to the DALI bus B.

According to the invention, any DALI bus known to a person skilled in the art can be used, wherein the present invention is not limited to any particular type of voltage supply of the DALI bus.

The DALI devices 3a, 3b and 3c in FIG. 1 each comprise a DALI interface with at least two DALI connections D1 and D2 via which they can be electrically connected to the DALI bus B, in order to then be able to communicate with each other in a connected state via the DALI bus according to the DALI industrial standard.

As already mentioned above, a DALI device preferably corresponds to a device, in particular a lighting technology device, which can be connected to a DALI bus and is configured to transmit and/or receive data or information according to the DALI standard via the DALI bus. That is, a DALI device is preferably configured to transmit and/or receive DALI signals via a DALI bus.

As shown in FIG. 1, the DALI device 3a preferably corresponds to a central control unit, by means of which the other DALI devices of the DALI system 1 can be activated centrally via the DALI bus B according to the DALI industrial standard. The DALI device 3b preferably corresponds to an operating device for the electrical supply of at least one illuminant, wherein an illuminant section 5 having at least one illuminant, in particular a light-emitting diode section having at least one light-emitting diode, is connected to the DALI device 3b in order to be supplied with a voltage, current and/or electrical energy by the DALI device 3b. The DALI device 3c preferably corresponds to a sensor arrangement having at least one sensor, such as, for example, a brightness sensor, a presence and/or motion sensor, or a temperature sensor.

Consequently, in the DALI system 1 in FIG. 1, the central control unit 3a can activate the operating device 3b on the basis of a detection of the sensor arrangement 3c, such as, for example, on the basis of a detected ambient brightness, in order to control the electric supply of the illuminant section 5 on the basis of the detection of the sensor arrangement 3c. In this case, the communication between the central control unit 3a, the operating device 3b and the sensor arrangement 3c is preferably performed by DALI signals, which are transmitted via the DALI bus according to the DALI industrial standard.

The signaling device 2 is connected to the DALI bus B, in particular to the two bus lines B1 and B2. As already stated above, according to the present invention, the signaling device 2 is configured to change the bus voltage of the DALI bus B in the idle state to a predetermined voltage value within the upper voltage value range of the DALI standard (for the bus voltage of the DALI bus for transmitting a high-level DALI signal), in order to transmit at least one digital signal, in particular a binary-encoded signal, or at least one analog signal via the DALI bus. The DALI devices 3a, 3b and 3c are preferably all configured to detect the change in the voltage value of the bus voltage in the idle state to the predetermined voltage value, in order to receive the at least one digital or analog signal transmitted from the signaling device 2 via the DALI bus.

That is, the DALI devices 3a, 3b and 3c are preferably all configured to recognize and evaluate the change in the voltage value of the bus voltage in the idle state to the predetermined voltage value as a digital or analog signal.

Consequently, the DALI devices 3b and 3c connected to the DALI bus B can be both activated centrally by the transmission of DALI signals according to the DALI industrial standard from the central control unit 3a via the DALI bus B and can also be activated manually by the transmission of at least one digital or analog signal from the signaling device 2 via the DALI bus B.

This is advantageous, since a manual activation of the DALI devices 3b and 3c in addition to the central activation of the DALI devices 3b and 3c from the central control unit 3a can be achieved by simply connecting the signaling device 2 to the DALI bus B.

The DALI system according to the invention can preferably also comprise one or more DALI devices which are not able to detect a change in the voltage value of the bus voltage to the predetermined voltage value within the upper voltage value range of the DALI standard and are consequently not configured for a manual activation by the signaling device 2.

In particular, to manually activate at least one DALI device, the signaling device 2 is configured to limit or reduce the voltage value of the bus voltage of the DALI bus B in the idle state to a predetermined voltage value within the upper voltage value range of the DALI standard, which is less than the voltage value of the bus voltage in the idle state. Consequently, the DALI devices according to the invention are then configured to detect this limitation of the bus voltage in the idle state to the predetermined voltage value and thereby to receive at least one digital or analog signal from the signaling device 2.

As already mentioned above, during the manual activation of the DALI devices by the signaling device, the DALI devices can continue to be activated by the transmission of DALI signals via the DALI bus.

That is, according to the present invention, a transmission of at least one digital or analog signal from the signaling device 2 via the DALI bus B and a transmission of at least one DALI signal according to the DALI industrial standard from a DALI device, such as, for example, the central control unit 3a, via the DALI bus B is possible simultaneously or in parallel. A central activation and a manual activation of the DALI devices via the DALI bus B can thus take place simultaneously or in parallel.

According to the invention, it can also be possible that there is no central control unit 3a on the DALI bus B, but rather a DALI device, for example the operating device 3b, take over in addition to the function of the electrical supply of the at least one illuminant, such as, for example, the illuminant section 5, but rather in addition the supply of the bus voltage of the DALI bus B. For this purpose, a DC/DC converter, for example, can be arranged in the DALI device 3b, which can output the bus voltage for the DALI bus B from the supply network SV, in particular via the two supply lines SV1 and SV2, at the DALI connections D1, D2.

Examples of this transmission according to the invention of control signals via a DALI bus are shown in the following FIGS. 3 and 4.

Figure 2:
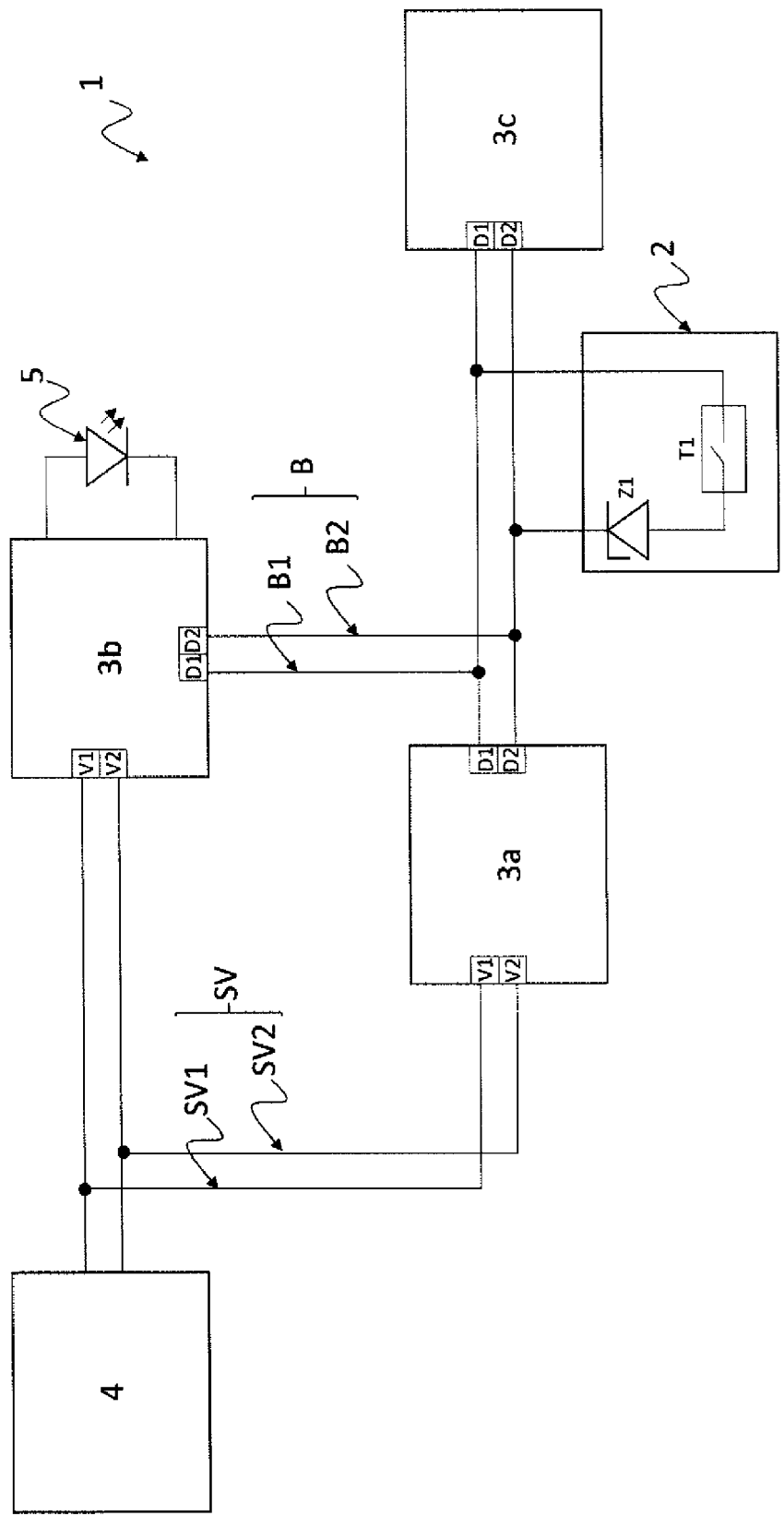
FIG. 2 is the schematic circuit diagram from FIG. 1, wherein a preferred embodiment of the signaling device according to the invention is shown schematically.

FIG. 2 shows the schematic circuit diagram from FIG. 1, wherein a preferred embodiment of the signaling device according to the invention is shown schematically.

As shown in FIG. 2, the signaling device 2 comprises a Zener diode Z1 and a switch T1. When the switch T1 is actuated by a user, the switch T1 closes the circuit between the bus line B1 and the bus line B2, in which the Zener diode Z1 is arranged, so that the Zener diode Z1 limits the bus voltage to the predetermined voltage value in the upper voltage value range of the DALI standard. Consequently, by actuating the switch T1, at least one digital or one analog signal can be transmitted via the DALI bus B.

The bus voltage in the idle state preferably corresponds to a logical zero ("0") and every other voltage value within the upper voltage value range of the DALI standard, in particular the predetermined voltage value, preferably corresponds to a logical one ("1") when at least one digital signal is transmitted by the limitation of the Zener diode Z1.

Since the switch T1 is electrically supplied by the bus voltage of the DALI bus B, which is preferably between 9.5 and 22.5 volts, and is galvanically separated from the supply lines SV1 and SV2 and the electric power supply source 4, an inexpensive switch T1 can be used.

The signaling device 2 can preferably also have more than one switch T1, wherein the multiple switches are then preferably connected in parallel to the DALI bus B.

Preferably, for the time period that the switch T1 is actuated, the bus voltage through the Zener diode Z1 is limited to the predetermined voltage value within the upper voltage value range of the DALI standard. Consequently, in addition to the actuation of the switch, information, in particular control information, can preferably be transmitted via the DALI bus via the length of the time period of the actuation of the switch. For example, by a brief actuation of the switch, which results in a brief change, in particular a limitation or reduction, of the bus voltage to the predetermined voltage value, a control signal can be transmitted via the DALI bus B, which causes the operating device 3b to switch on or switch off the illuminant section 5. By a second brief actuation of the switch, a control signal can then preferably be transmitted via the DALI bus, which causes the operating device 3b to switch off or switch on the illuminant section again.

Preferably, a control signal which causes the operating device 3b to dim the light output of the illuminant section 5 can now be transmitted via the DALI bus by a longer actuation of the switch T1 which leads to a longer change, in particular a limitation, of the bus voltage to the predetermined voltage value. In this case, the degree of dimming then preferably depends on the length of the time period of the actuation of the switch T1 and consequently the length of the time period of the change, in particular the limitation, of the bus voltage to the predetermined voltage value.

That is, control information, such as, for example, a degree of dimming for dimming an illuminant section, can preferably be provided via the length of the time period of the change, in particular the limitation, of the bus voltage of the DALI bus B to the predetermined voltage value caused by the signaling device 2, wherein the degree of dimming is preferably higher or stronger with a longer time period.

The signal transmitted by the signaling device according to the invention is preferably evaluated by a central control unit connected to the DALI bus, which then (depending on its configuration) generates on the basis of the signal at least one DALI signal for activating at least one DALI device connected to the DALI bus, such as, for example, an operating device or converter, and forwards it to the at least one DALI device.

For example, in the DALI system in FIG. 1, the central control unit 3a can evaluate a digital or analog signal transmitted by the signaling device 2 via the DALI bus B, in order then to generate on the basis of this evaluation DALI signals for activating the operating device 3b and transmit them to the operating device 3b.

The DALI device 3a, 3b and 3c according to the invention is preferably configured to detect and evaluate the switch actuation of the switch T1 with regard to the actuation time period and/or the repetition of the actuation. In particular, the DALI device according to the invention is configured to detect a change, in particular a limitation, of the bus voltage in the idle state to the predetermined voltage value within the upper voltage value range of the DALI standard and to measure the time period of this change as a switch actuation time period. The DALI device according to the invention is then preferably configured to recognize an end of the actuation of the switch when the bus voltage returns from the predetermined voltage value to the original bus voltage value of the DALI bus in the idle state.

As can be seen in FIG. 2, the signaling device 2 is advantageous, since it can be easily implemented using commercially available and inexpensive components such as, for example, a Zener diode Z1 and a switch T1 and can be connected directly to the DALI bus without the need for an additional interface or an adapter module.

Only the DALI devices connected to the DALI bus need to be configured to detect the change in the bus voltage in the idle state to the predetermined voltage value within the upper voltage value range of the DALI standard caused by the signaling device 2 for transmitting at least one digital or analog signal, in order to be able to receive and evaluate the at least one digital or analog signal.

According to the invention, the behavior of the DALI device according to the invention can be configured or set via the DALI interface or an additional interface of a DALI device according to the invention in response to a detection of the bus voltage change to the predetermined voltage value caused by the signaling device 2.

The signaling device 2 can additionally or alternatively comprise a relay and/or a sensor. In the event that the signaling device 2 comprises a relay, the bus voltage of the DALI bus is preferably changed, in particular limited, by actuating the relay to the predetermined voltage value for the time period of the actuation of the relay. In the event that the signaling device 2 comprises a sensor, the bus voltage of the DALI bus is preferably changed, in particular limited, on the basis of a detection of the sensor, such as, for example, a motion of a person or a specific brightness level, to the predetermined voltage value for the time period of the detection of the sensor or for a predetermined time period.

For example, the signaling device having a brightness sensor can change, in particular limit, the bus voltage of the DALI bus to the predetermined voltage value for a predetermined time period, whereby a digital or analog signal with a signal length or signal time period corresponding to the predetermined time period is transmitted via the DALI bus. This signal length then preferably corresponds to a degree of dimming for dimming the light output of a light connected to the DALI bus as a DALI device. Alternatively, the signal length can also indicate a time period during which the light output of a light connected to the DALI bus as a DALI device is set to a predetermined dimming level.

The DALI system according to the invention is particularly suitable for what are referred to as "self-powered" DALI applications, with which a DALI device in the form of an operating device provides the supply or voltage supply of the DALI bus. In such a case, a user can then build a small "island" solution using a DALI bus, at least one DALI device according to the invention and at least one signaling device according to the invention. For example, the user can connect an operating device or driver for the electrical supply of at least one illuminant section and an intelligent sensor to the DALI bus as DALI devices.

The intelligent sensor is preferably configured to monitor the brightness and optionally additionally receive radio commands, for example for color control, and to transmit the detected brightness information and/or the received radio commands via the DALI bus according to the DALI industrial standard. The user can then additionally connect a signaling device according to the invention to the DALI bus, in order to be able to directly influence the brightness and/or the switching on and off of the illuminant section electrically supplied by the operating device. In particular, the signaling device comprises a switch so that the user can influence or manually control the brightness and/or the switching on and off of the illuminant section electrically supplied by the operating device by actuating the switch. With regard to the details of this manual control via the signaling device, reference is made to the explanations given above and to the following explanations with regard to FIGS. 3 and 4.

Figure 3:
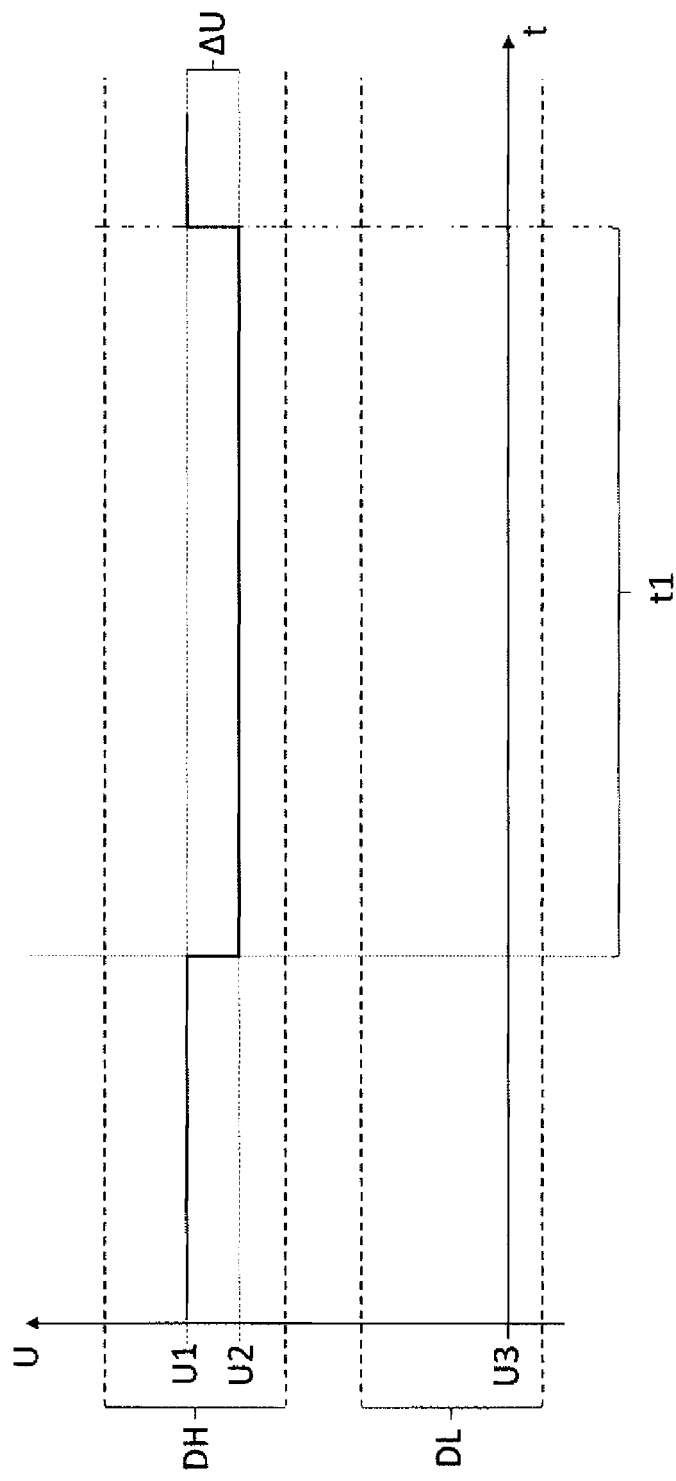
FIG. 3 is an example of a transmission of a signal via a DALI bus from the signaling device according to the invention.

FIG. 3 schematically shows an example of a transmission of a signal from the signaling device according to the invention via a DALI bus.

FIG. 3 shows the bus voltage U of a DALI bus over time t, wherein, during the time period t1, a signal is transmitted via the DALI bus by a signaling device according to the invention connected to the DALI bus. As already mentioned above, the signal transmitted by the signaling device can preferably be a digital signal, in particular a binary-encoded signal, or an analog signal. The bus voltage of the DALI bus in the idle state corresponds to the voltage value U1, which lies within the upper voltage value range DH according to the DALI standard for the bus voltage of the DALI bus for transmitting a high-level DALI signal.

As shown in FIG. 3, during the time period t1, the signaling device limits or reduces the bus voltage to a predetermined voltage value U2, which is less than the voltage value U1 and likewise lies in the upper voltage value range DH of the DALI standard, in order to transmit a signal having a signal length or signal time period t1 via the DALI bus. The difference value or voltage difference ΔU between the voltage value U1 of the bus voltage in the idle state and the predetermined voltage value U2 to which the signaling device changes the bus voltage to transmit at least one signal is preferably such that the voltage values U1 and U2 both lie within the upper voltage value range DH according to the DALI standard.

FIG. 3 also shows the lower voltage value range DL according to the DALI standard for the bus voltage of the DALI bus for transmitting a low-level DALI signal. Since the bus voltage in FIG. 3 does not drop to a voltage value within the lower voltage value range DL at any time, a transmission of a DALI signal via the DALI bus is not shown in FIG. 3.

Figure 4:
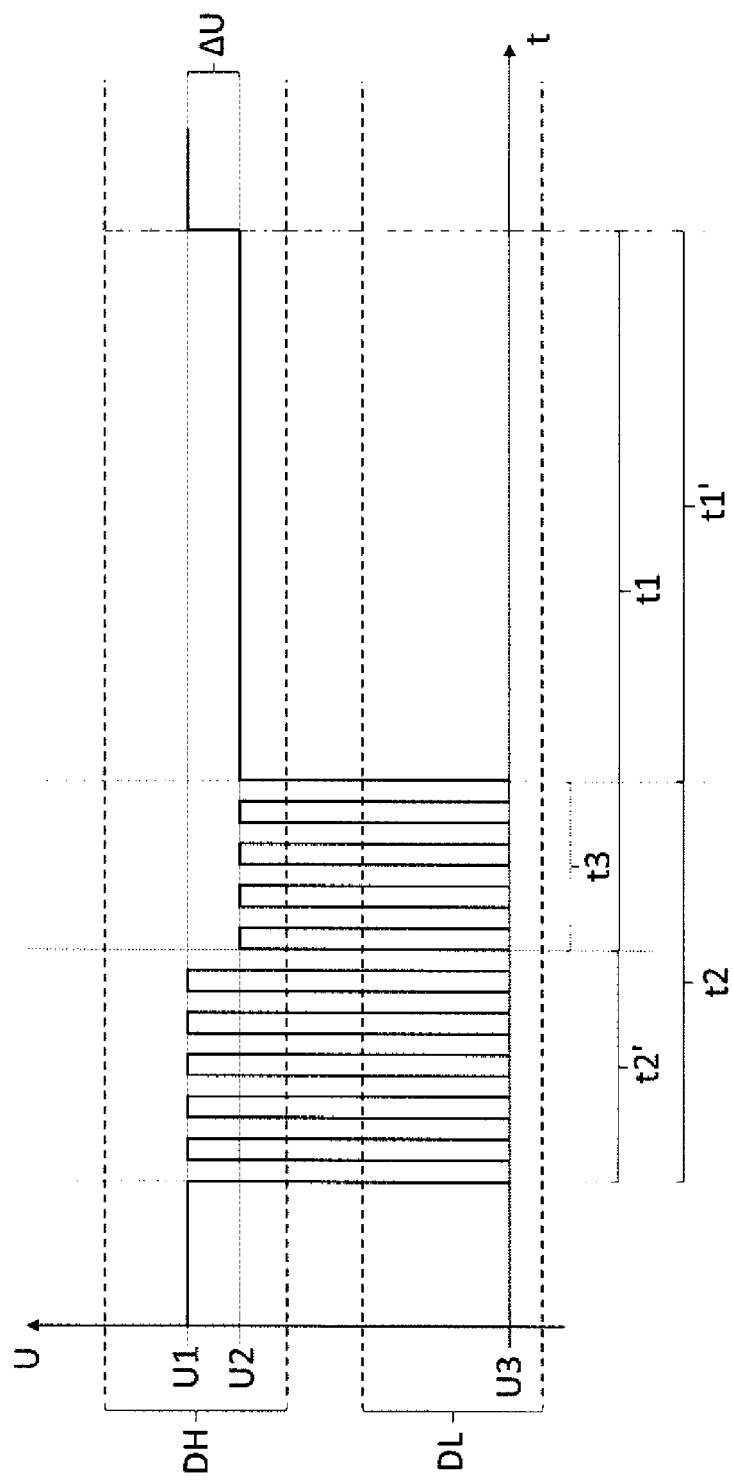
FIG. 4 is an example of a simultaneous transmission of a signal from the signaling device according to the invention and a DALI signal via a DALI bus.

FIG. 4 schematically shows an example of a simultaneous transmission of a signal from the signaling device according to the invention and a DALI signal via a DALI bus.

As shown in FIG. 4, the signaling device according to the invention transmits a signal via the DALI bus during the time period t1. For further information in this respect, reference is made to the preceding explanations of FIG. 3. Furthermore, during the time period t2, a DALI signal is transmitted via the DALI bus, since during this time period, the bus voltage always drops again to the voltage value U3 within the lower voltage value range DL according to the DALI standard, wherein the voltage value U3 is preferably zero volts. In particular, this dropping of the bus voltage to the voltage value U3 for transmitting the DALI signal via the DALI bus is achieved by a repeated short-circuiting of the DALI bus. The voltage pulses generated thereby preferably correspond to individual bits to be transmitted, which form the DALI signal as a pulse packet.

As shown in FIG. 4, during the time period t2', only one DALI signal is transmitted via the DALI bus, and during the time period t1', only one signal is transmitted from the signaling device according to the invention via the DALI bus.

During the time period t3, a simultaneous transmission of a signal from the signaling device according to the invention and a DALI signal via the DALI bus takes place. On the one hand, during the time period t3, the bus voltage in the idle state is limited to the predetermined voltage value U2, and the predetermined voltage value U2 always drops again to the voltage value U3 within the lower voltage value range DL of the DALI standard. As already mentioned above, the signal transmitted by the signaling device can preferably be a digital signal, in particular a binary-encoded signal, or an analog signal.

Since the predetermined voltage value U2 lies within the upper voltage value range DH of the DALI standard, a DALI signal can be transmitted via the DALI bus during the time period t1 by repeatedly lowering the bus voltage from the voltage value U2 to the voltage value U3. Since, during the transmission of the DALI signal, the bus voltage is preferably always pulled up again to a voltage value within the upper voltage value range DH of the DALI standard, the change in the bus voltage to the predetermined voltage value U2 can also be detected during the time period t2.

Control information, such as, for example, the degree of dimming of a light output of a DALI device connected to the DALI bus, can be provided via the time period t1 of the signal of the signaling device. For example, the longer the time period t1, the greater or stronger the degree of dimming.

According to the present invention, a simultaneous or parallel transmission of at least one signal of a signaling device and at least one DALI signal via a DALI bus is possible, wherein the signal serves for the manual activation of at least one DALI device connected to the DALI bus.

What is claimed is:

1. A signaling device (2) for use in a DALI system (1) with a DALI bus (B),
   wherein, according to a DALI standard, an upper voltage value range (DH) is established for a bus voltage of the DALI bus (B) for transmitting a high-level DALI signal via the DALI bus, and the bus voltage of the DALI bus (B) lies within the upper voltage value range (DH) in idle state;
   wherein the signaling device (2) is configured for being connected to the DALI bus (B) of the DALI system (1), and
   wherein, in connected state, the signaling device (2) is configured to change the bus voltage of the DALI bus to a predetermined voltage value (U2) within the upper voltage value range (DH) in the idle state.

2. The signaling device (2) according to claim 1, which, in the connected state, is configured to transmit at least one digital signal, which is a binary-encoded signal, via the DALI bus (B) by changing the bus voltage to the predetermined voltage value (U2).

3. The signaling device (2) according to claim 1 wherein the predetermined voltage value (U2) is less than the voltage value (U1) of the bus voltage in the idle state and, in the connected state, the signaling device (2) is configured to limit the bus voltage of the DALI bus (B) in the idle state to the predetermined voltage value (U2); or
   the predetermined voltage value is greater than the voltage value (U1) of the bus voltage in the idle state and, in the connected state, the signaling device (2) is configured to increase the bus voltage of the DALI bus (B) in the idle state to the predetermined voltage value.

4. The signaling device (2) according to claim 1,
   wherein the predetermined voltage value differs from the bus voltage (U1) of the DALI bus in the idle state by 0.5 V or more than 0.5 V.

5. The signaling device (2) according to claim 1, comprising
   at least one voltage limitation unit (Z1) comprising a Zener diode, which is configured to limit the bus voltage of the DALI bus (B) in the idle state to the predetermined voltage value (U2), or
   at least one voltage booster unit comprising a voltage source, which is configured to increase the bus voltage of the DALI bus in the idle state to the predetermined voltage value.

6. The signaling device (2) according to claim 1, which corresponds to a switch arrangement (T1, Z1) with at least one switch (T1), which, in the connected state, is configured to increase or limit the bus voltage of the DALI bus (B) by a user on the basis of an actuation of the switch (T1) to the predetermined voltage value (U2) for the time period of the actuation or for a predetermined period of time.

7. The signaling device (2) according to claim 1 wherein the signaling device is used in a DALI system (1) with a DALI bus (B) for transmitting at least one digital signal via the DALI bus (B), the signaling device (2) is connected to the DALI bus (B) of the DALI system (1), and in the connected state, the signaling device (2) changes the bus voltage of the DALI bus (B) in the idle state to a predetermined voltage value (U2) within the upper voltage value range (DH).

8. The signaling device (2) according to claim 7 and a DALI device (3a, 3b, 3c) in a DALI system (1) with a DALI bus (B) for communication via the DALI bus (B),
   wherein the signaling device (2) and the DALI device (3a, 3b, 3c) are connected to the DALI bus (B) of the DALI system (1),
   wherein, in the connected state, the signaling device (2) changes the bus voltage of the DALI bus (B) in the idle state to a predetermined voltage value (U2) within the upper voltage value range (DH), and
   wherein the DALI device (3a, 3b, 3c) detects the change in the bus voltage of the DALI bus (B) in the idle state to the predetermined voltage value (U2) within the upper voltage value range (DH).

9. The signaling device (2) according to claim 1, which corresponds to a relay arrangement with a relay, which, in the connected state, is configured to increase or limit the bus voltage of the DALI bus (B) on the basis of an actuation of the relay by a user to the predetermined voltage value (U2) for the time period of the actuation or for a predetermined time period.

10. The signaling device (2) according to claim 1, which corresponds to a sensor arrangement with at least one sensor, which, in the connected state, is configured to increase or limit the bus voltage of the DALI bus (B) on the basis of a detection by the sensor to the predetermined voltage value (U2) for the time period of the detection or a predetermined time period.

11. A DALI device (3a, 3b, 3c) for use in a DALI system (1) with a DALI bus (B),
   wherein, according to a DALI standard, an upper voltage value range (DH) is established for a bus voltage of the DALI bus (B) for transmitting a high-level DALI via the DALI bus (B), and the bus voltage of the DALI bus (B) lies within the upper voltage value range (DH) in idle state,
   wherein the DALI device (3a, 3b, 3c) is configured for being connected to the DALI bus (B) in a DALI system (1) as a bus device, and
   wherein, in connected state, the DALI device (3a, 3b, 3c) is configured to detect a change in the bus voltage of the DALI bus (B) in the idle state to a predetermined voltage value (U2) within the upper voltage value range (DH).

12. A DALI system (1) comprising a DALI bus (B), at least one signaling device (2) wherein, according to a DALI standard, an upper voltage value range (DH) is established for a bus voltage of the DALI bus (B) for transmitting a high-level DALI signal via the DALI bus, and the bus voltage of the DALI bus (B) lies within the upper voltage value range (DH) in idle state, the signaling device (2) is configured for being connected to the DALI bus (B) of the DALI system (1), and in connected state, the signaling device (2) is configured to change the bus voltage of the DALI bus to a predetermined voltage value (U2) within the upper voltage value range (DH) in the idle state: and
   at least one DALI device (3a, 3b, 3c) according to claim 11;
   wherein the at least one signaling device (2) and the at least one DALI device (3a, 3b, 3c) are connected to the DALI bus (B);
   wherein the signaling device (2) is configured to change the bus voltage of the DALI bus (B) in the idle state to a predetermined voltage value (U2) within the upper voltage value range (DH); and
   wherein the DALI device (3a, 3b, 3c) is configured to detect the change in the bus voltage of the DALI bus (B) in the idle state to the predetermined voltage value (U2) within the upper voltage value range (DH).

13. The DALI system (1) according to claim 12, wherein the DALI device (3a, 3b, 3c) is configured to receive at least one digital signal, which is a binary-encoded signal, from the signaling device (2) via the DALI bus (B) by detecting the change in the bus voltage of the DALI bus (B) in the idle state to the predetermined voltage value (U2) within the upper voltage value range (DH).

14. The DALI system (1) according to claim 12 wherein the DALI device (3a, 3b, 3c) is configured to transmit at least one DALI signal via the DALI bus (B) by reducing the bus voltage to a voltage value (U3) within the lower voltage value range (DL), while the bus voltage of the DALI bus (B) in the idle state corresponds to the predetermined voltage value (U2) within the upper voltage value range (DH).

15. The DALI system (1) according to claim 12, wherein, in the connected state, the DALI device (3a, 3b, 3c) is configured to receive at least one preferably digital signal from the signaling device (2) and at least one DALI signal simultaneously by detecting a change in the bus voltage of the DALI bus (B) in the idle state to the predetermined voltage value (U2) by the signaling device (2) and a reduction in the bus voltage of the DALI bus (B) from the predetermined voltage value (U2) to a voltage value (U3) within the lower voltage value range (DL).

16. The DALI device (3a, 3b, 3c) according to claim 11, which,
   in the connected state, is configured to receive at least one digital signal, which is a binary-encoded signal, via the DALI bus (B) by detecting a change in the bus voltage of the DALI bus (B) in the idle state to the predetermined voltage value (U1) within the upper voltage value range.

17. The DALI device (3a, 3b, 3c) according to claim 11, wherein, according to the DALI standard, a lower voltage value range (DL) is established for the bus voltage of the DALI bus (B) for transmitting a low-level DALI signal via the DALI bus (B), and
   wherein, in the connected state, the DALI device (3a, 3b, 3c) is configured to receive at least one DALI signal by detecting a reduction in the bus voltage of the DALI bus (B) in the idle state to a voltage value (U3) within the lower voltage value range (DL).

18. The DALI device (3a, 3b, 3c) according to claim 17, wherein, in the connected state, the DALI device (3a, 3b, 3c) is configured to receive at least one digital signal and at least one DALI signal simultaneously by detecting a change in the bus voltage of the DALI bus (B) in the idle state to the predetermined voltage value (U2) within the upper voltage value range (DH) and a reduction of the bus voltage of the DALI bus (B) from the predetermined voltage value (U2) to a voltage value (U3) within the lower voltage value range (DL).

19. The DALI device (3a, 3b, 3c) according to claim 11, wherein, the connected state, the DALI device (3a, 3b, 3c) is configured to transmit at least one DALI signal via the DALI bus (B) by reducing the bus voltage of the DALI bus (B) to a voltage value (U3) within the lower voltage value range (DL).

* * * * *